(12) United States Patent
Fluegge

(10) Patent No.: US 9,838,586 B2
(45) Date of Patent: Dec. 5, 2017

(54) PORTABLE APPARATUS FOR USE IN MACHINE VISION

(71) Applicant: Cognex Corporation, Natick, MA (US)

(72) Inventor: Kai Fluegge, Aachen (DE)

(73) Assignee: Cognex Corporation, Natick, MA (US)

( * ) Notice: Subject to any disclaimer, the term of this patent is extended or adjusted under 35 U.S.C. 154(b) by 907 days.

(21) Appl. No.: 13/755,590

(22) Filed: Jan. 31, 2013

(65) Prior Publication Data

US 2014/0210990 A1    Jul. 31, 2014

(51) Int. Cl.
*H04N 9/47* (2006.01)
*H04N 7/18* (2006.01)
*H04N 5/232* (2006.01)

(52) U.S. Cl.
CPC .................................. *H04N 5/232* (2013.01)

(58) Field of Classification Search
USPC ............ 348/86, 64, 61, 158, 207.2, 208.15, 348/207.11, 231.4, 372, 374, 375, 376, 348/725, 25, 142, 169, 207.1, 208.1, 348/208.14, 211.1, 228.1, 303, 608, 636, 348/680, 693, 706, 730, 731, 838, 552, 348/569; 439/194, 530, 578, 890, 119; 235/435, 462.01, 462.04, 462.08, 493; 455/24, 95; 340/3.9, 5.5, 7.31, 854, 340/855.2, 995.16; 725/133, 80, 81, 141
See application file for complete search history.

(56) References Cited

U.S. PATENT DOCUMENTS

| | | | |
|---|---|---|---|
| 5,646,912 A * | 7/1997 | Cousin .................. | A61J 7/0481 221/15 |
| 6,183,297 B1 * | 2/2001 | Kay et al. .................... | 439/578 |
| 6,219,527 B1 * | 4/2001 | Ogawa .......................... | 455/13.1 |
| 7,100,826 B1 * | 9/2006 | Phan ..................... | G06Q 10/087 235/385 |
| 8,103,085 B1 * | 1/2012 | Zadeh ..................... | G06T 7/001 356/237.1 |
| 8,985,444 B2 * | 3/2015 | Hammer ....................... | 235/383 |
| 2004/0016804 A1 * | 1/2004 | Namaky et al. ............. | 235/435 |
| 2004/0032501 A1 * | 2/2004 | Silverbrook et al. ...... | 348/207.2 |
| 2005/0108762 A1 * | 5/2005 | Chao et al. ..................... | 725/81 |
| 2006/0179408 A1 * | 8/2006 | Ko ......................... | G06F 9/4443 715/715 |
| 2006/0215011 A1 * | 9/2006 | P. S. et al. ................. | 348/14.02 |
| 2006/0258216 A1 * | 11/2006 | Konda ................. | H01R 13/665 439/607.01 |
| 2007/0094699 A1 * | 4/2007 | Chen ..................... | H04N 5/775 725/133 |
| 2007/0260785 A1 * | 11/2007 | Chen .................... | G06F 3/1423 710/62 |

(Continued)

*Primary Examiner* — Jefferey F Harold
*Assistant Examiner* — Mustafizur Rahman
(74) *Attorney, Agent, or Firm* — Mark H. Whittenberger; Holland & Knight LLP

(57) ABSTRACT

A portable machine vision component for use in machine vision systems is provided. The component can include a base portion configured to removably connect with a machine vision device, the base portion including an electrical input and an electrical output. The component can also include a control system operatively connected with the base portion, the control system configured to control an operation of the machine vision device and to receive feedback from the machine vision device. The component can further include one or more interface elements associated with the base portion, the one or more interface elements configured to allow a user to access the control system and communicate with the machine vision device.

21 Claims, 5 Drawing Sheets

(56) References Cited

U.S. PATENT DOCUMENTS

| | | | |
|---|---|---|---|
| 2008/0027707 A1* | 1/2008 | Stefik et al. | 704/9 |
| 2008/0066329 A1* | 3/2008 | Bascom | G01C 15/002 33/290 |
| 2008/0231897 A1* | 9/2008 | Ito | 358/1.15 |
| 2009/0029647 A1* | 1/2009 | Wei | G06F 3/147 455/41.3 |
| 2009/0045234 A1* | 2/2009 | Carnevali | 224/199 |
| 2010/0097768 A1* | 4/2010 | Ishii | H01L 23/4006 361/719 |
| 2010/0244765 A1* | 9/2010 | Collopy | G06F 1/1632 320/103 |
| 2010/0250975 A1* | 9/2010 | Gill | G06F 1/1632 713/300 |
| 2010/0251361 A1* | 9/2010 | Collopy | G06F 1/1616 726/19 |
| 2010/0267276 A1* | 10/2010 | Wu | H01R 25/003 439/502 |
| 2011/0010644 A1* | 1/2011 | Merrill | G06F 8/34 715/762 |
| 2011/0065193 A1* | 3/2011 | Kitagawa | G01N 35/00613 436/43 |
| 2011/0242002 A1* | 10/2011 | Kaplan | G06F 3/04883 345/173 |
| 2012/0059233 A1* | 3/2012 | Huber et al. | 600/323 |
| 2012/0067952 A1* | 3/2012 | Matsuda | 235/437 |
| 2012/0069535 A1* | 3/2012 | Cai | H04N 5/775 361/752 |
| 2013/0131718 A1* | 5/2013 | Jenson | A61B 17/0057 606/213 |
| 2014/0131904 A1* | 5/2014 | Tang | A61M 16/1075 261/142 |

* cited by examiner

PORTABLE APPARATUS FOR USE IN MACHINE VISION

TECHNICAL FIELD

This technology relates to machine vision systems and methods, and more particularly to a portable apparatus for use in controlling a machine vision system.

BACKGROUND

During mass production, packaging, shipping and other manufacturing, warehousing and retail processes, automated motion devices, including, for example, automated guided vehicles and conveyor belts, are used extensively to transport both component parts, manufactured components, completed products and packages between stations. To track the movement of these components, the parts on the conveyor belt or automated motion device are often marked with identifying symbols such as bar codes, data matrixes, symbols, identifying characters or other types of identifying data. This data is imaged by machine vision systems or other data reading devices that include a camera for acquiring image data. Machine vision is used commonly to inspect manufactured objects, parts, printing and other physical items for visible flaws and defects. A variety of systems have been developed to perform such inspection, many of which contain a variety of advanced flaw-detection features and tools. One advanced inspection system is available under the Insight® product line from Cognex Corporation of Natick, Mass. Such systems can be trained with a model image of a desired part appearance, and employ advanced pattern recognition tools to compare the stored model image to the runtime image being inspected. After the image data is acquired, the data is decoded using a variety of advanced techniques including, for example, pattern recognition, and the data is used to track the movement of objects. Many of today's machine vision systems lack an appropriate user interface. This lack of control can cause a number of problems for the user of the device.

SUMMARY OF DISCLOSURE

In one implementation, a portable machine vision component for use in machine vision systems is provided. The portable machine vision component can include a base portion configured to removably connect with a machine vision device, the base portion including an electrical input and an electrical output. The portable machine component can also include a control system operatively connected with the base portion, the control system configured to control an operation of the machine vision device and to receive feedback from the machine vision device. The portable machine component can also include one or more interface elements associated with the base portion, the one or more interface elements configured to allow a user to access the control system and communicate with the machine vision device.

One or more of the following features can be included. In some embodiments, the base portion can be configured to removably connect with a control cable associated with the machine vision device. The one or more interface elements can include at least one audio indicator and/or at least one visual indicator. The base portion can be configured to removably connect with a computing device configured to receive one or more signals from the machine vision device. The portable machine vision component can include an electrical isolator operatively connected with the base portion, the electrical isolator configured to isolate one or more electrical components associated with the portable machine vision component. The base portion can be configured to removably connect with a power/communications port associated with the control cable of the machine vision device. The electrical isolator can include an overmolded protective layer configured to protect the one or more electrical components. The one or more interface elements can include a trigger configured to activate the bar code reader. The one or more interface elements can include a tuner configured to tune the bar code reader.

In another implementation, a machine vision system is provided. The machine vision system can include a machine vision device and a portable machine vision component configured to removably connect with the machine vision device, wherein the portable machine vision component includes a base portion having an electrical input and an electrical output, the portable machine vision component including a control system operatively connected with the base portion, the control system configured to control an operation of the machine vision device and to receive feedback from the machine vision device, the portable machine vision component including one or more interface elements associated with the base portion, the one or more interface elements configured to allow a user to access the control system and communicate with the machine vision device. The machine vision system can further include a computing device configured to receive one or more signals from the machine vision device through the portable machine vision component, wherein the portable machine vision component is located in-line between the machine vision device and the computing device.

One or more of the following features can be included. In some embodiments, the base portion can be configured to removably connect with a control cable associated with the machine vision device. The one or more interface elements can include at least one audio indicator and/or at least one visual indicator. The base portion can be configured to removably connect with a computing device configured to receive one or more signals from the machine vision device. The machine vision component can include an electrical isolator operatively connected with the base portion, the electrical isolator configured to isolate one or more electrical components associated with the portable machine vision component. The base portion can be configured to removably connect with a power/communications port associated with the control cable of the machine vision device. In some embodiments, the machine vision device can be a bar code reader. The one or more interface elements can include a trigger configured to activate the bar code reader. The one or more interface elements can include a tuner configured to tune the bar code reader.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings can indicate like elements.

DETAILED DESCRIPTION OF THE EMBODIMENTS

Figure 1:
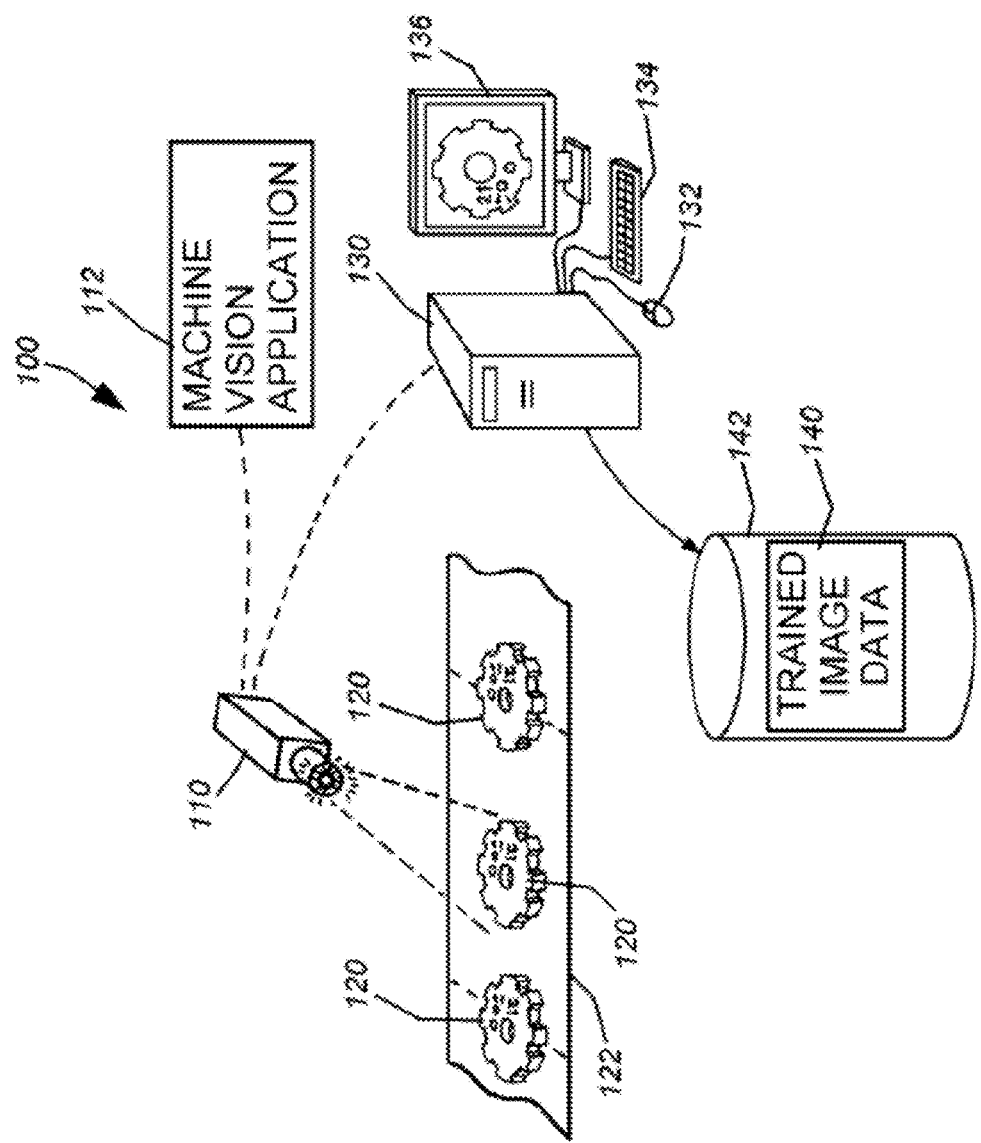
FIG. 1 is a diagrammatic view of a machine vision system according to an embodiment of the present disclosure.

System Overview:

Referring now to FIG. 1, an exemplary embodiment depicting one example of a machine vision system 100 is provided. It should be noted that a variety of system implementations can be employed in alternate embodiments without departing from the scope of the present disclosure. As will be described in further detail below, embodiments of the portable machine vision component can be generally employed, inter alia, to provide a user interface that may allow a user to control and/or monitor the operation of a machine vision device such as a barcode reader.

In some embodiments, machine vision system 100 can include an imaging device 110, which can be a camera that includes an onboard processor (not shown) and a memory (not shown) capable of running a machine vision application 112. Appropriate interfaces, alarms, and signals can be installed in, and/or connected to, camera imaging device 110 so that it is able to respond to a sensed fault detected during the inspection of an underlying object 120. In this embodiment, a conveyor 122 containing a plurality of objects (120) is shown. These objects can pass, in turn, within the predetermined field of view (FOV) of the imaging device 110, so that their runtime images can be acquired and inspected for flaws (and/or other features of interest) during an inspection process. As such, the imaging device 110 can acquire at least one image of each observed object 120.

In some embodiments, imaging device 110 may be associated with a data reader and/or camera which can include an optical system and, optionally, one or more light sources. The camera can be coupled to an image processing system that includes a controller and a memory element. The image processing system may include a frame grabber for creating a series of fixed images from the image stream generated by the imaging device 110, and vision application 112 for decoding or otherwise processing the images acquired by imaging device 110, and may be connected to an operator terminal or display 136. In operation, a controller can adjust the resolution of imaging device 110 to acquire low resolution image data until an object is detected, and triggers a high resolution image acquisition mode only when an object is detected, as described more fully below.

Referring still to FIG. 1, imaging device 110 can be positioned adjacent a conveyor 122 or adjacent a path for moving objects. The moving objects 120 can each include an identifying mark which can be, for example, a bar code, a data matrix, a series of characters, a direct part mark, or other data or symbols which can be imaged by the imaging device 110 and decoded by the image processing system.

In some embodiments, conventional microcomputer 130 can be any suitable computing device such as computer 12 shown in FIG. 1. Computer 130 can include graphical user interface components, such as a mouse 132, keyboard 134 and display 136. Other types of interfaces can also be employed, such as a Personal Digital Assistant (PDA) in alternate embodiments. In some embodiments, the imaging device 110 can be connected full-time to the computer 130, particularly where the computer performs the image processing functions. Additionally and/or alternatively, the processor in imaging devices, such as those of the Insight® product line, can allow for independent operation of the device free interconnection with a remote computer. In this embodiment, computer 130 can be connected to, and/or communicates with, the imaging device 110 for device-setup, testing, and analysis of runtime operation. In some embodiments, data related to a model or training image 140 can be stored in connection with the computer 130 in disc storage 142, and can be stored in the onboard memory of the imaging device 110.

Figure 2:
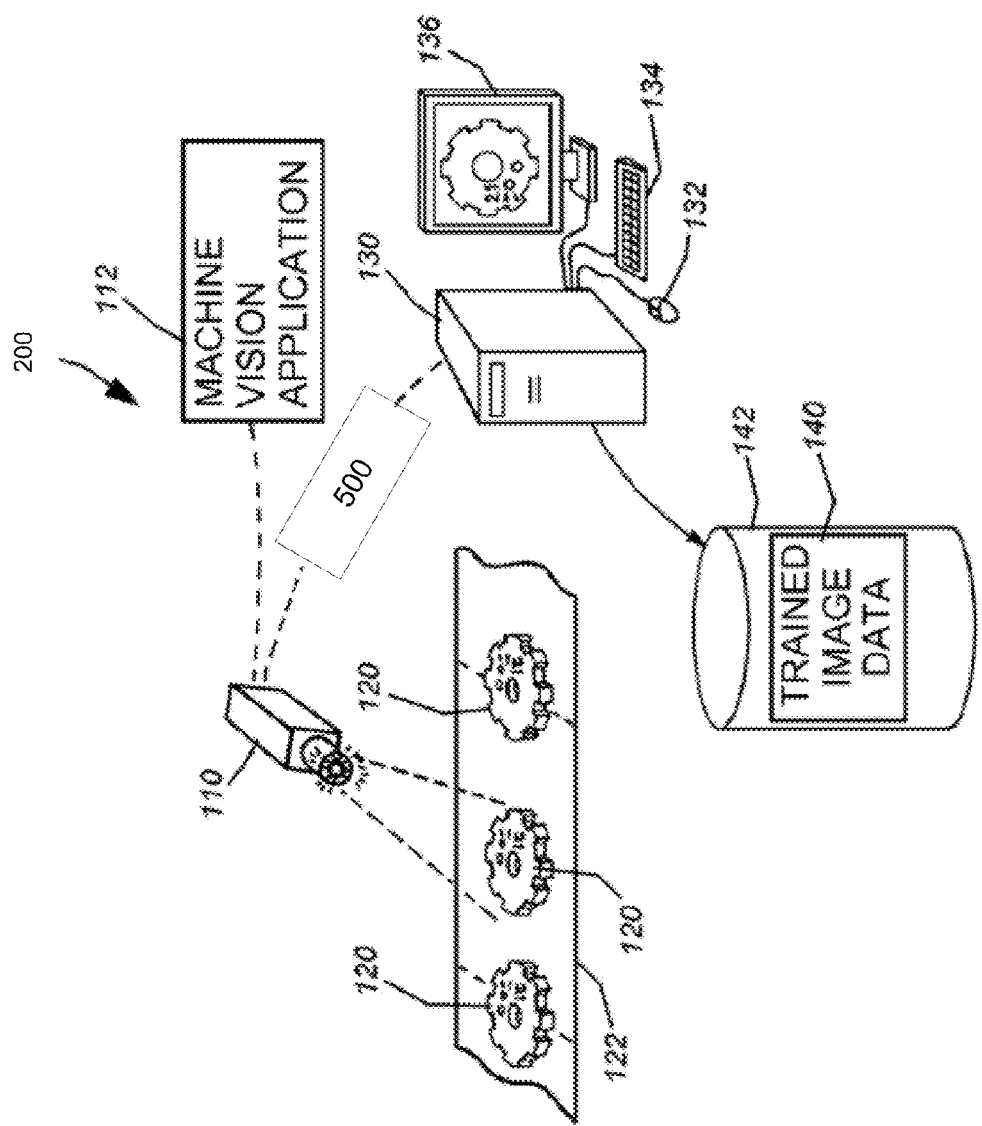
FIG. 2 is a diagrammatic view of a machine vision system including a portable machine vision component according to another embodiment of the present disclosure.

Referring also to FIG. 2, and as will be discussed below in greater detail, machine vision system 200 may also include a machine vision component 500, which can be configured to provide a user with a mechanism to control and/or monitor the operation of aspects of machine vision system 200. Machine vision component 500 can be located between computer 130 and a machine vision device such as imaging device 110. Machine vision component 500 can be configured to removably connect with machine vision device 110 and/or one or more computing devices. In some embodiments, portable machine vision component 500 can include a control system operatively connected therewith.

In some embodiments, the control system can be configured to control an operation of machine vision device 110 and to receive feedback from machine vision device 110. The machine vision system can further include computing device 130 configured to receive one or more signals from machine vision device 110 through portable machine vision component 500. As shown in FIG. 2, in some embodiments portable machine vision component 500 can be located in-line between machine vision device 110 and computing device 130. The structure and operation of machine vision component 500 is discussed in further detail below with reference to FIGS. 3-5.

Figure 3:
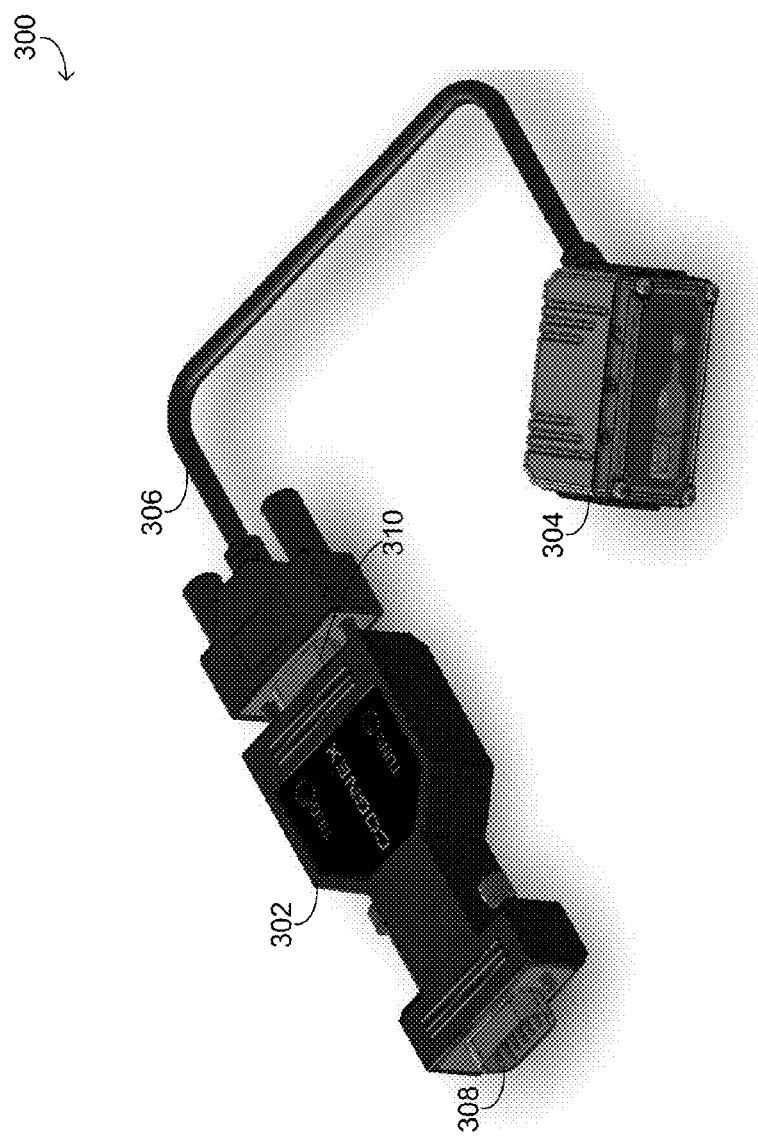
FIG. 3 is a perspective view of a machine vision component according to another embodiment of the present disclosure.

Referring now to FIG. 3, an embodiment of a portable machine vision component 300 is provided. In some embodiments, portable machine vision component 300 can include a base portion 302 and may be configured to removably connect with a machine vision device such as machine vision device 304. Machine vision device 304 may be any suitable machine vision device, including but not limited to, bar code readers available from the assignee of the present disclosure. In some embodiments, machine vision device 304 can include a cable or adapter which may be configured to electrically connect machine vision device 304 with other devices. Machine vision component 300 may be removable connected to both machine vision device 304 and a computing device such as computer 130. Additionally and/or alternatively, machine vision component 300 may be configured to wirelessly connect with machine vision device 304 and/or one or more computing devices using any suitable wireless transmission protocol.

As shown in FIG. 3, portable machine vision component 300 can include base portion 302, which may include an electrical input 308 and electrical output 310. Each of electrical input 308 and electrical output 310 can be configured to both transmit and receive various signals to/from machine vision device 304. In the particular embodiment depicted in FIG. 3, electrical output 310 is shown connected to one end of machine vision device cable 306. Additionally and/or alternatively, electrical input 308 can be configured to connect with any suitable computing device such as computer 130 shown in FIGS. 1-2. Base portion 302 can be configured to removably connect with a power/communications port associated with the control cable of machine vision device 304.

In some embodiments, portable machine component 300 includes a control system, which can be operatively connected with base portion 302. The control system can be configured to control the operation of machine vision device 304. Accordingly, the control system can be configured to receive feedback from machine vision device 304 and to transmit one or more signals to a computing device such as computer 130 via electrical input 308.

In some embodiments, portable machine vision component 300 can also include one or more interface elements associated with base portion 302. The interface elements may be configured to allow a user to access the control system and to communicate with machine vision device 304. The arrangement and operation of the interface elements are discussed in further detail with reference to FIG. 5 below.

Figure 4:
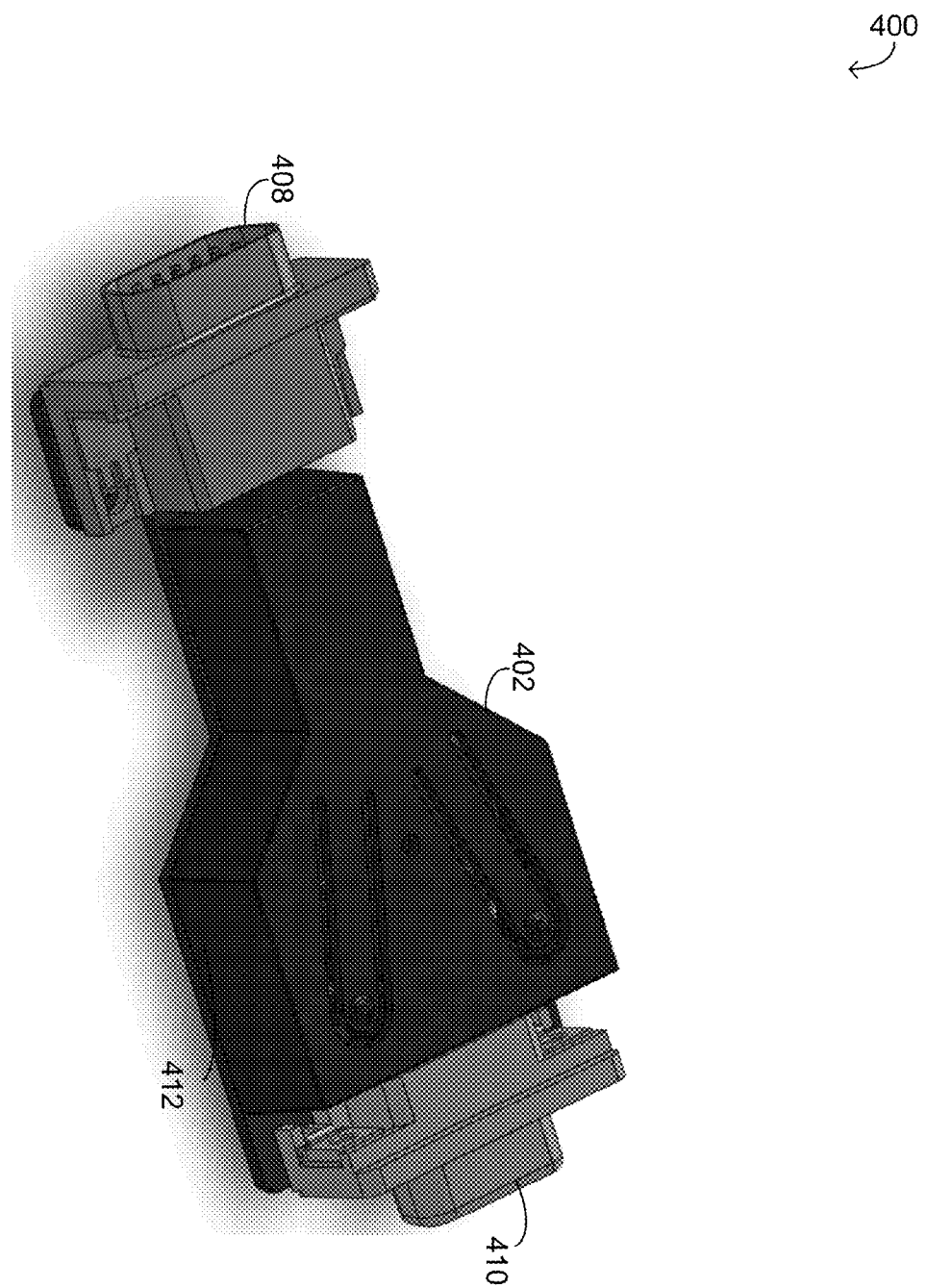
FIG. 4 is a perspective view of a machine vision component according to another embodiment of the present disclosure.

Referring now to FIG. 4, an embodiment of a portable machine vision component 400 is provided. In some embodiments, portable machine vision component 400 can include base portion 402, which may include an electrical input 408 and electrical output 410 similar to the configuration described above in FIG. 3. In some embodiments, portable machine vision component 400 can also include an electrical isolator 412 operatively connected with base portion 402. Electrical isolator 412 can be configured to isolate one or more electrical components associated with portable machine vision component 400. For example, electrical isolator 412 can include an overmolded protective layer (e.g. plastic, etc.) configured to protect the one or more electrical components. Accordingly, construction of the overmolded protective layer may result in decreased housing costs associated with manufacturing and can also meet leak proof-requirements. In order to ensure the functionality of the moving parts inside portable machine vision component 400, these parts may be protected by a cover as shown in FIG. 4. In some embodiments, this cover can be used to prevent overmold material from contacting the parts inside (e.g., tact switches, beepers, etc.). The physical access to the tact switches can be established by a thin foil, as shown with reference to interface elements 512 in FIG. 5, that may contact one or more portions of the cover.

Figure 5:
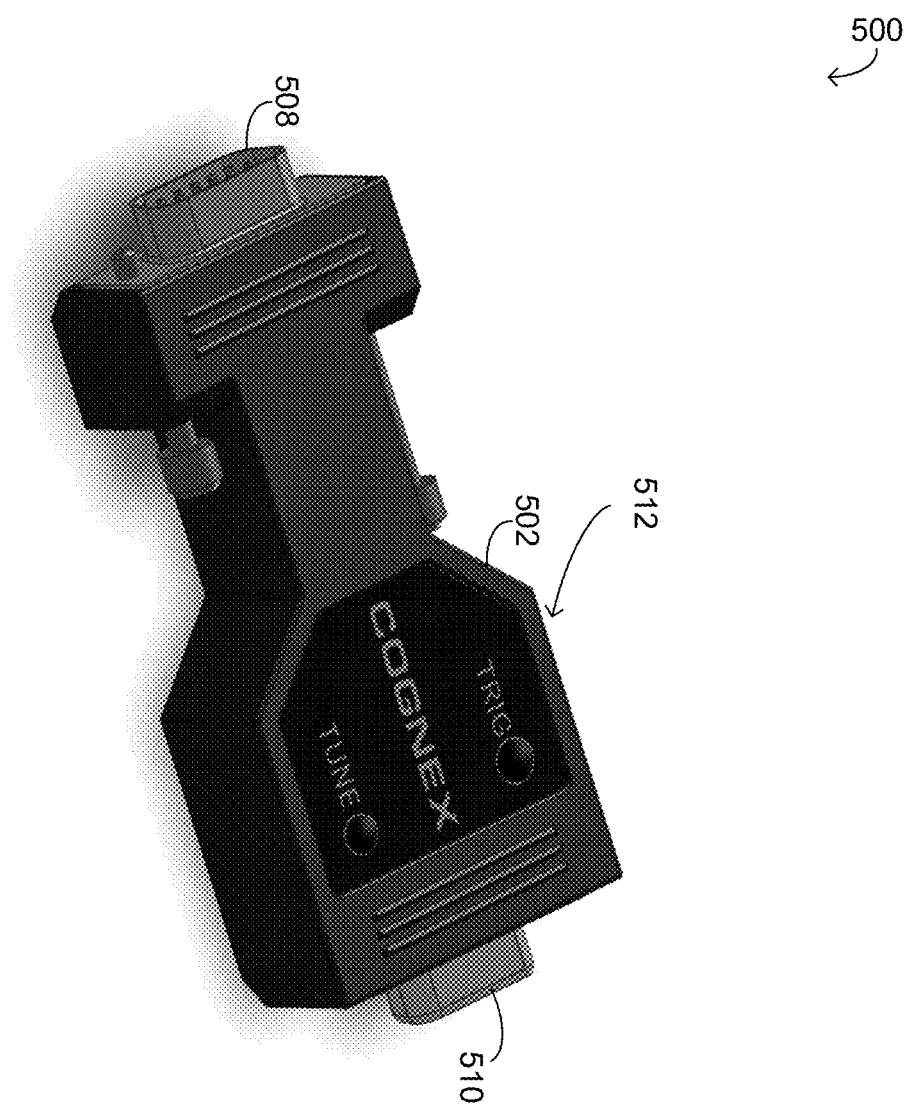
FIG. 5 is a perspective view of a machine vision component according to another embodiment of the present disclosure.

Referring now to FIG. 5, an embodiment of a portable machine vision component 500 is provided. In some embodiments, portable machine vision component 500 can include one or more interface elements 512. In some embodiments, interface elements 512 can include at least one audio indicator and/or at least one visual indicator. Additionally and/or alternatively, interface elements 512 can include a trigger configured to activate machine vision device 304 (e.g. bar code reader). The machine vision device 304 may be configured to read and/or decode a code upon selection of the trigger. In some embodiments, upon selection of the trigger, machine vision device 304 may be configured to capture an image and to find/decode any code that is associated with that image. Interface elements 512 can also include a tuner (e.g. tune button). In some embodiments, machine vision device 304 (e.g. bar code reader) may be configured to tune itself for a specific code when the tune button is selected. In some embodiments, tuning may refer to automatically comparing all possible configurations of parameters in order to obtain the best settings for decoding a specific code. In some embodiments, parameters may include, but are not limited to, light intensity, color, bank, exposure-time, etc.

Accordingly, interface elements 512 of portable machine vision component 500 can be configured to allow a user to access the control system and communicate with the machine vision device.

Accordingly, embodiments of the portable machine vision component described herein may be used as an accessory device for a code reader or machine vision camera that contains interface elements which are used during installation or setup of the device. Some interface elements can include, but are not limited to, buttons, beeper, light emitting diodes ("LEDs"), displays, etc.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims.

What is claimed is:

1. A portable machine vision component comprising:
   a base portion configured to removably connect with a machine vision device, the base portion including an electrical input and an electrical output;
   a control system operatively connected with the base portion, the control system configured to control an operation of the machine vision device and to receive feedback from the machine vision device; and
   one or more interface elements associated with the base portion, the one or more interface elements configured to allow a user to access the control system and communicate with the machine vision device.

2. The portable machine vision component of claim 1, wherein the base portion is configured to removably connect with a control cable associated with the machine vision device.

3. The portable machine vision component of claim 1, wherein the one or more interface elements includes at least one audio indicator.

4. The portable machine vision component of claim 1, wherein the one or more interface elements includes at least one visual indicator.

5. The portable machine vision component of claim 1, wherein the base portion is configured to removably connect with a computing device configured to receive one or more signals from the machine vision device.

6. The portable machine vision component of claim 1, further comprising:
an electrical isolator operatively connected with the base portion, the electrical isolator configured to isolate one or more electrical components associated with the portable machine vision component.

7. The portable machine vision component of claim 2, wherein the base portion is configured to removably connect with a power/communications port associated with the control cable of the machine vision device.

8. The portable machine vision component of claim 6, wherein the electrical isolator includes an overmolded protective layer configured to protect the one or more electrical components.

9. The portable machine vision component of claim 1, wherein the one or more interface elements includes a trigger configured to activate a code reader.

10. The portable machine vision component of claim 1, wherein the one or more interface elements includes a tuner configured to tune a code reader.

11. A machine vision system comprising:
a machine vision device;
a portable machine vision component configured to removably connect with the machine vision device, wherein the portable machine vision component includes a base portion having an electrical input and an electrical output, the portable machine vision component including a control system operatively connected with the base portion, the control system configured to control an operation of the machine vision device and to receive feedback from the machine vision device, the portable machine vision component including one or more interface elements associated with the base portion, the one or more interface elements configured to allow a user to access the control system and communicate with the machine vision device; and
a computing device configured to receive one or more signals from the machine vision device through the portable machine vision component, wherein the portable machine vision component is located in-line between the machine vision device and the computing device.

12. The machine vision system of claim 11, wherein the base portion is configured to removably connect with a control cable associated with the machine vision device.

13. The machine vision system of claim 11, wherein the one or more interface elements includes at least one audio indicator.

14. The machine vision system of claim 11, wherein the one or more interface elements includes at least one visual indicator.

15. The machine vision system of claim 11, wherein the base portion is configured to removably connect with a computing device configured to receive one or more signals from the machine vision device.

16. The machine vision system of claim 11, further comprising:
an electrical isolator operatively connected with the base portion, the electrical isolator configured to isolate one or more electrical components associated with the portable machine vision component.

17. The machine vision system of claim 11, wherein the base portion is configured to removably connect with a power/communications port associated with the control cable of the machine vision device.

18. The machine vision system of claim 11, wherein the machine vision device is a code reader.

19. The machine vision system of claim 18, wherein the one or more interface elements includes a trigger configured to activate the code reader.

20. The machine vision system of claim 18, wherein the one or more interface elements includes a tuner configured to tune the code reader.

21. A portable machine vision component comprising:
a base portion configured to removably connect with a machine vision device, the base portion including an electrical input and an electrical output, wherein the base portion is configured to removably connect with a control cable associated with the machine vision device and wherein the base portion is further configured to removably connect with a computing device configured to receive one or more signals from the machine vision device;
a control system operatively connected with the base portion, the control system configured to control an operation of the machine vision device and to receive feedback from the machine vision device; and
one or more interface elements associated with the base portion, the one or more interface elements configured to allow a user to access the control system and communicate with the machine vision device, wherein the one or more interface elements includes a trigger configured to activate a code reader and a tuner configured to tune the code reader.

* * * * *